United States Patent [19]

Dauber

[11] 4,059,907
[45] Nov. 29, 1977

[54] ELECTRICAL OUTLET AND SWITCHBOX LOCATOR

[76] Inventor: Howard Dauber, 24 Heron Lane, Commack, N.Y. 11725

[21] Appl. No.: 717,130

[22] Filed: Aug. 24, 1976

[51] Int. Cl.² .......................... G01B 5/14; G01B 3/00
[52] U.S. Cl. ............................. 33/174 G; 33/180 R; 33/DIG. 10
[58] Field of Search ......... 33/174 G, 180 R, DIG. 10

[56] References Cited

U.S. PATENT DOCUMENTS

| | | | |
|---|---|---|---|
| 1,559,386 | 10/1925 | Valentine | 33/174 G |
| 3,522,658 | 8/1970 | Howell | 33/174 G |
| 3,678,588 | 7/1972 | Isola et al. | 33/180 R |
| 3,808,690 | 5/1974 | Balder | 33/180 R |
| 3,842,510 | 10/1974 | Elliott | 33/174 G |

Primary Examiner—Richard E. Aegerter
Assistant Examiner—Richard R. Stearns
Attorney, Agent, or Firm—Allen D. Brufsky

[57] ABSTRACT

A framework of spaced vertical telescoping members and spaced horizontal telescoping members is adjustable positioned in front of a wall having an electrical outlet. The width of the framework is adjusted to the width of a wall panel to be installed on the wall. A template is slidably mounted on a horizontal bar extending between the vertical telescoping members. The horizontal bar is slidable along the vertical members so the template can be quickly located over an electrical outlet on a wall, the framework removed, turned around and placed over a wall panel and the location of the template traced to locate the outlet opening on the wall panel.

7 Claims, 4 Drawing Figures

ELECTRICAL OUTLET AND SWITCHBOX LOCATOR

BACKGROUND OF THE INVENTION

This invention relates to a construction tool, and more particularly, a construction tool for locating and marking an electrical outlet or switch box on an interior wall panel prior to installing the panel.

In constructing interior walls by covering studs with gypsum or wood panels or when covering gypsum with decorative panelling, it is necessary to measure precisely the location of electrical outlets and switch boxes previously mounted on or between the studs. If an error is made in measuring the relative location of the outlet or switch box with respect to the edges of the panel to be installed, an entire panel may be ruined. Accordingly, the precise location of openings to be cut from panels to accommodate outlets and switch boxes can be tedious and time consuming.

SUMMARY OF THE INVENTION

In accordance with the invention, a locating tool is provided which includes a framework of vertical and horizontal telescoping members. The vertical members are adjusted so as to extend from floor to ceiling in front of the outlet or switch box opening to be reproduced on the wall panel. The horizontal members are also adjusted to the width of the panel on which the outlet opening is to be reproduced. A template both vertically and horizontally adjustable on the framework is then located over the outlet. The framework is removed, placed in clips having a flat base and positioned on the wall panel. The template location is traced on the panel, which is then cut, accurately locating the outlet opening.

BRIEF DESCRIPTION OF THE DRAWING

Further objects and advantages of the invention will become apparent from the following description and claims, and from the accompanying drawing, wherein:

DETAILED DESCRIPTION OF THE PREFERRED EMBODIMENT

Figure 1:
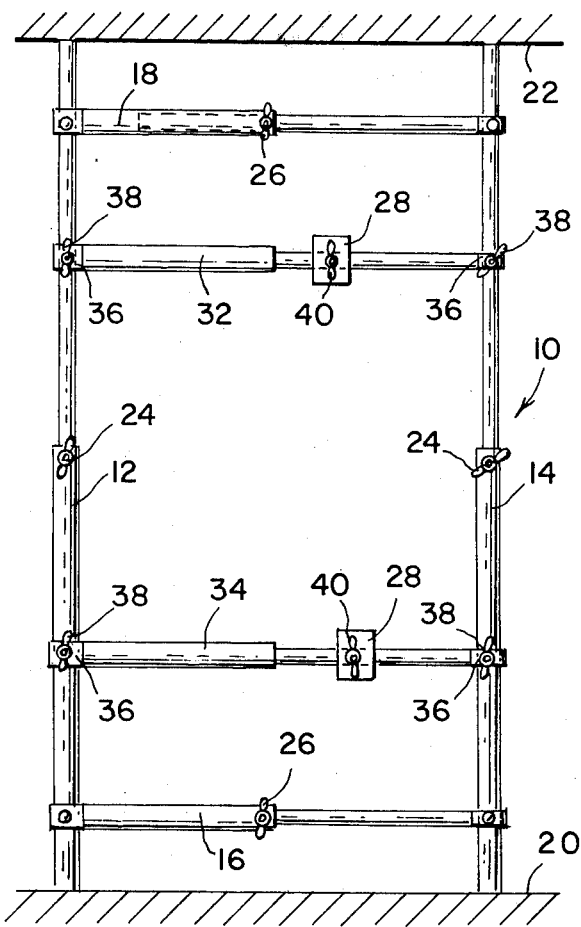
FIG. 1 is a front view in elevation of the locating tool of the invention positioned between a floor and ceiling to locate an outlet and/or switch box.

Referring now in detail to the drawing, wherein like numerals indicate like elements throughout the several views, the locating tool 10 of the present invention includes a framework having a pair of spaced, vertical telescoping members 12, 14 and a pair of spaced, horizontal telescoping members 16, 18, riveted at their opposite ends to members 12, 14.

As shown in FIG. 1, the vertical members 12, 14 are adjusted so as to extend from room floor 20 to a ceiling 22 and locked in adjusted position by thumbscrews 24 in the outer sleeve of each member 12, 14. Horizontal members 16, 18 are then adjusted to the width of the wall panel to be installed and locked in adjusted position by thumbscrews 26 in the outer sleeve of each member 16, 18.

A rectangular template 28 for an outlet or switch box is slidably mounted by a ring 30 on its rear surface on a pair of spaced, horizontal telescoping slide bars 32, 34 having sleeves 36 on their oppsite ends slidable vertically along top and bottom, respectively, of members 12 and 14. The templates 28 are adjusted vertically by sliding sleeves 36 on members 12, 14 to the vertical height of the outlet or switch box and retained at that height by tightening thumbscrews 38 on sleeves 36. Templates 28 are then slid horizontally over the outlet or switch box on the adjacent wall and retained in the located position by thumbscrews 40 on each template.

Figure 2:
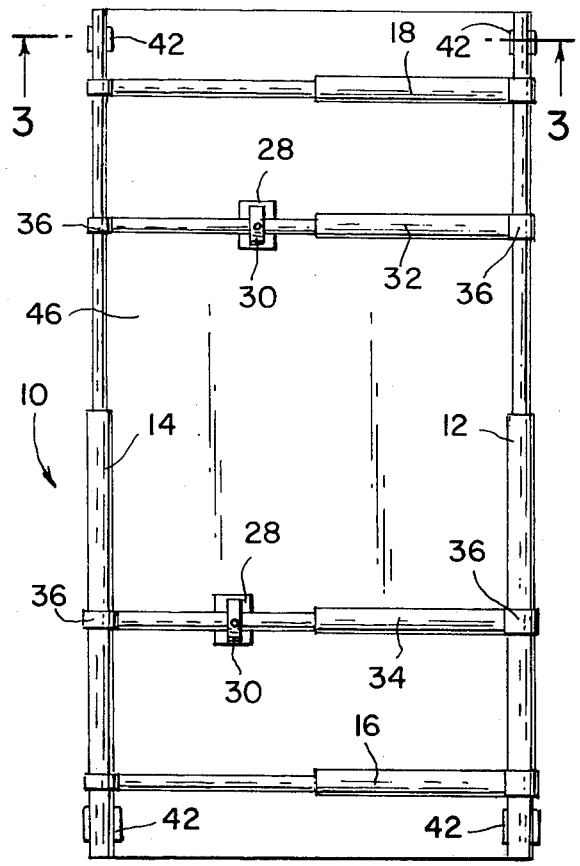
FIG. 2 is a rear view in elevation of the tool of FIG. 1 applied to a wall panel to locate the outlet and/or switch box opening located on the wall of FIG. 1 on the panel.
Figure 3:
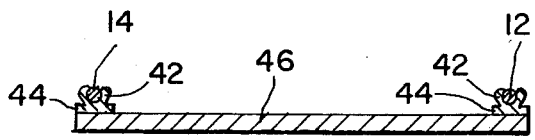
FIG. 3 is a cross-sectional view taken substantially along the plane indicated by line 3—3 of FIG. 2.
Figure 4:
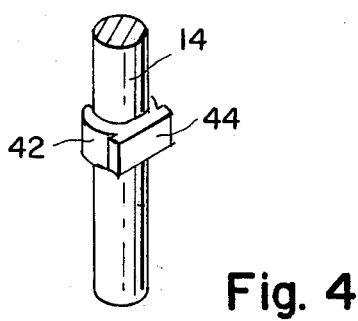
FIG. 4 is a partial perspective view of one of the adjustment members of the framework in FIG. 2.

The framework is then removed from its engagement between floor 20 and ceiling 22, turned over, and has its members 12, 14 engaged in clips 42 having flat bases 44. The flat bases 44 of each clip 42 is then placed on the surface of the wall panel 46 to be installed, as shown in FIG. 2. The outline of each template 28 is traced on the panel 46, accurately locating the outlet and switch box on panel 46, and openings cut in the panel.

I claim:

1. A tool for locating and marking an electrical outlet or the like on a wall panel prior to installation comprising:
    a framework including a spaced pair of horizontal telescoping members connected at the ends thereof to a pair of spaced vertical telescoping members;
    at least one horizontal bar between said pair of vertical members slidably mounted at its opposite ends on said vertical members for vertical movement therealong; and
    a template for locating an electrical outlet or the like slidably mounted on said horizontal bar for horizontal movement therealong.

2. The tool of claim 1 including a clip having a flat base attached to each of the vertical telescoping members for positioning the framework on a planar wall panel.

3. The tool of claim 1 including means for locking each of said vertical and horizontal telescoping members in its telescopically adjusted position.

4. The tool of claim 1 wherein said horizontal bar includes sleeves on opposite ends thereof slidably mounted on said vertical telescoping members.

5. The tool of claim 4 including means on said sleeves for locking said sleeves to said vertical telescoping members.

6. The tool of claim 1 wherein said template includes a sleeve on its rear surface slidably mounted on said horizontal bar.

7. The tool of claim 6 wherein said template includes means for locking said template to said horizontal bar.

* * * * *